3 Sheets—Sheet 1.
W. E. DAMANT, dec'd.,
Assignor, by mesne assignments, to W. HESSIN.
Lozenge-Cutting Machine.
No. 9,060. Reissued Jan. 27, 1880.
FIG. I.
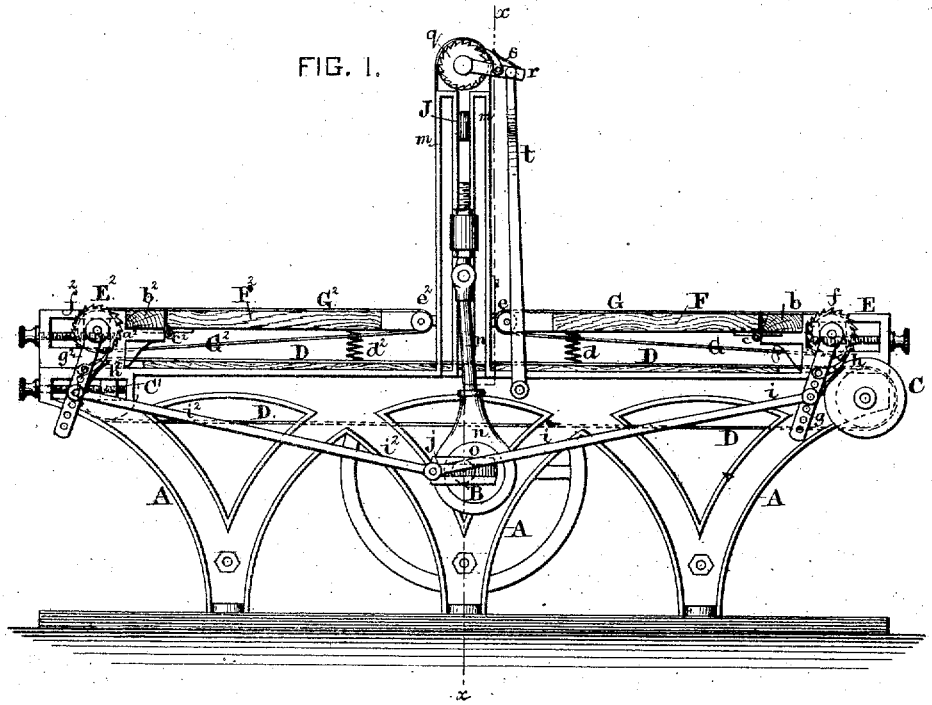
FIG. II.
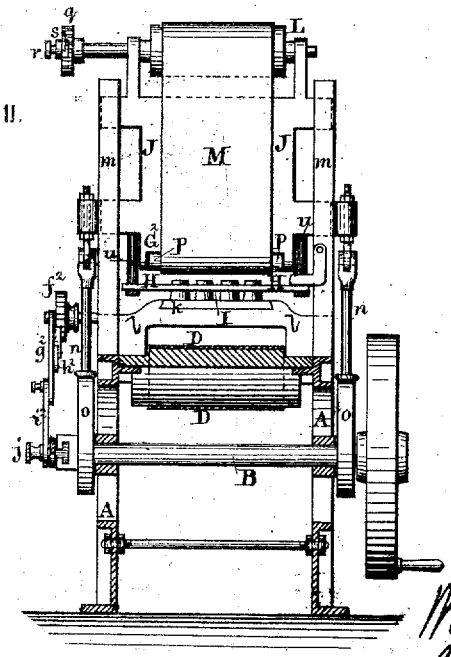
WITNESSES:
S. Howe
Geo. R. Bjington
INVENTOR.
William Hessin
Assignee of W. E. Damant, dec'd.
by W. H. H. Smith 3 Sheets—Sheet 2.
W. E. DAMANT, dec'd.,
Assignor, by mesne assignments, to W. HESSIN.
Lozenge-Cutting Machine.
No. 9,060. Reissued Jan. 27, 1880.
FIG. III.
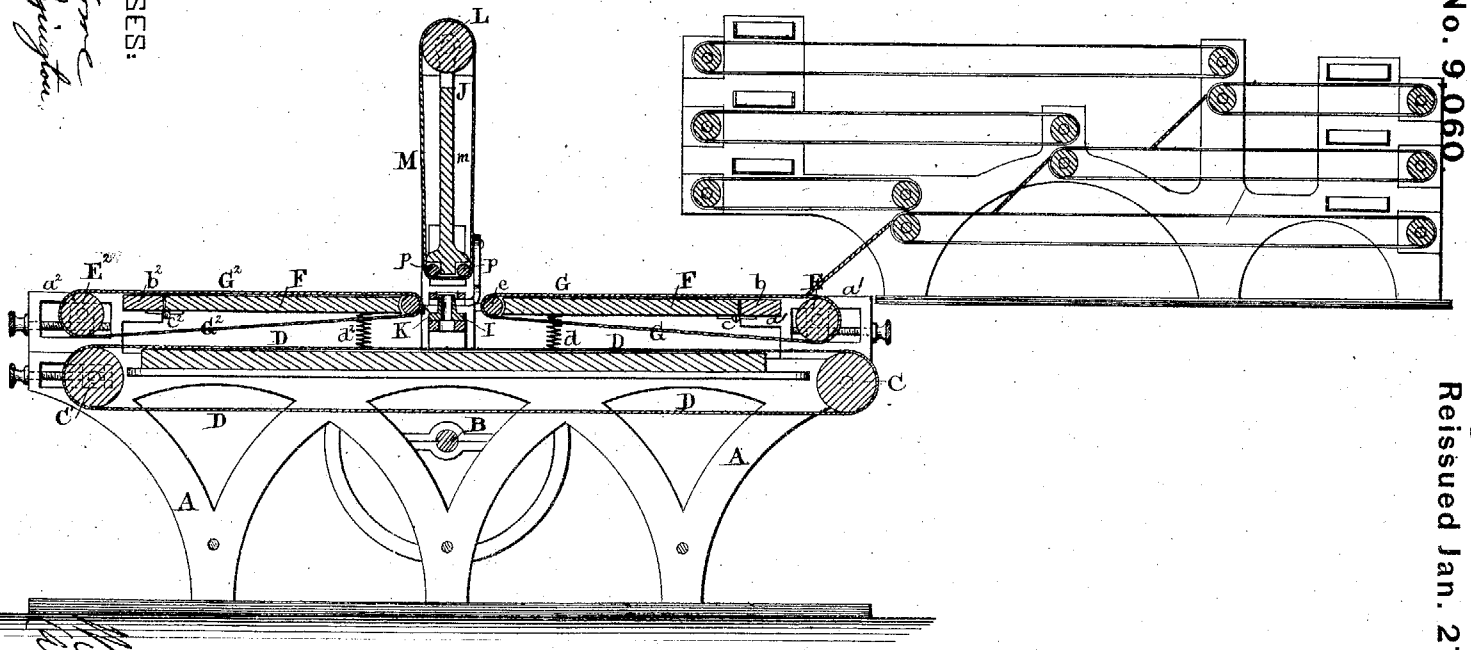
WITNESSES:
D. Moore
Chas. R. Byington
INVENTOR
Wilbur Hessin,
Assignee of
W. E. Damant, dec'd.
by G. H. W. Hessin 3 Sheets—Sheet 3.
W. E. DAMANT, dec'd.,
Assignor, by mesne assignments, to W. HESSIN.
Lozenge-Cutting Machine.
No. 9,060. Reissued Jan. 27, 1880.
FIG. IV.
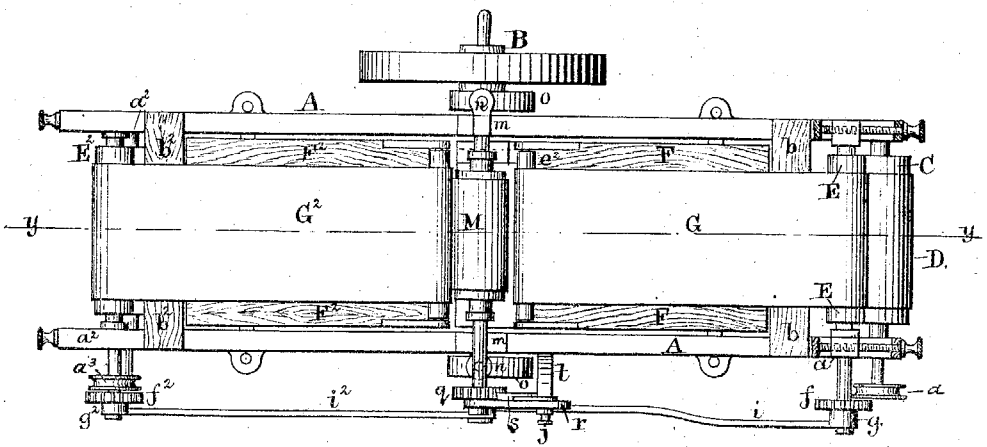
WITNESSES:
S P Lore
Geo. R. Byington.
INVENTOR:
William Hessin,
Assignee of W. E. Damant, dec'd
by Geo. H. W. J. Hoyt
Atty.

UNITED STATES PATENT OFFICE.

WILLIAM HESSIN, OF TORONTO, ONTARIO, CANADA, ASSIGNEE, BY MESNE ASSIGNMENTS, OF WILLIAM E. DAMANT, DECEASED.

LOZENGE-CUTTING MACHINE

SPECIFICATION forming part of Reissued Letters Patent No. 9,060, dated January 27, 1880.

Original No. 113,635, dated April 11, 1871; Reissue No. 5,099, dated October 15, 1872. Application for Reissue filed August 20, 1879.

*To all whom it may concern:*

Be it known that WILLIAM EDWARD DAMANT, of West Hoboken, in the county of Hudson and State of New Jersey, did invent a new and useful Lozenge-Cutting Machine, of which the following is a specification, reference being had to the accompanying drawings, and to the letters of reference marked thereon.

This invention relates to a new machine for cutting the flat pieces of confectionery known as "lozenges," and which are usually circular, but sometimes of other form.

This invention has for its general object the production of co-operative action between or among the rolling, feeding, cutting, and delivering devices pertaining to the machine, whereby simplicity, rapidity, and efficiency of operation are obtained.

To these ends the invention consists, first, in the combination, in a lozenge-machine, of cutters, a cutter-block provided with intermittently-acting endless apron mounted thereon, and co-operating with the cutters in the cutting operation, and an intermittently-acting feeding-apron.

The invention consists, secondly, of cutters and a cutter-block provided with intermittently-acting endless apron mounted thereon, and co-operating with the cutters in the cutting operation, and an intermittently-acting feeding-apron, combined with an endless delivery-apron.

The invention consists, thirdly, in adding to the above combination an endless-apron paste-rolling appliance.

The invention consists, fourthly, in combining, with the cutting intermittently-acting feeding-apron and endless rotative delivery mechanisms above described, an interposed frame-work placed between the cutters and cutter-block for holding the paste.

The invention consists, fifthly, in a reciprocating cutter-block provided with rollers and an endless apron mounted thereon, combined with ratchet mechanism for imparting an intermittent rotation to the said apron.

The invention consists, sixthly, of cutters, an interposed frame-work, a cutter-block provided with endless apron mounted thereon, having intermittent rotation and co-operating with the cutters in the cutting operation, an intermittently-rotative feed-apron, and a rotative delivery-apron, having means for adjusting their tension, combined with a main or common driving-shaft and ratchet and other mechanism connected therewith, for imparting the various reciprocating movements and continuous and intermittent rotations to the respective parts.

The invention consists, seventhly, in a reciprocating cutter-block provided with an endless apron mounted thereon, having intermittent rotation, and an intermittently-acting endless-apron feed-table carrying a projecting frame-work to support the paste during the cutting, combined with an endless delivery-apron.

The invention consists, eighthly, in a reciprocating cutter-block provided with an endless apron mounted thereon, having intermittent rotation, an intermittently-acting endless-apron feed-table provided with a projecting frame-work for supporting the paste during the cutting, and springs interposed between said reciprocating cutter-block and projecting frame, combined with an endless delivery-apron.

The invention consists, ninthly, in a reciprocating cutter-block, an intermittently-acting feed-apron, and an endless rotative delivery-apron, combined with mechanism imparting a concurrent motion to the said parts.

The invention consists, tenthly, in the combination, with a reciprocating cutter-block and an endless apron pertaining thereto and mounted thereon, of mechanism, substantially as described, whereby the reciprocating movement of the block and the intermittent rotation of its apron are concurrently effected.

The invention consists, lastly, in other details of the feeding and cutting mechanism, all as hereinafter particularly set forth.

In the accompanying drawings, Figure I is a side view of the machine. Fig. II is a vertical transverse section of the same on line *x x* of Fig. I. Fig. III is a vertical longitudinal section of the same on line *y y* of Fig. IV, and showing also an attachment for rolling the paste. Fig. IV is a plan or top view of the machine.

Similar letters of reference indicate similar parts in all the views.

A represents the frame of the machine. Across the frame is hung the driving-shaft B, which receives rotary motion by suitable means.

At the two ends of the frame A are mounted drums C C′, the centers of which are placed in about the same plane. The said drums carry an endless apron, D. Continuous or intermittent rotation is imparted to one of the drums for moving the apron D in the desired manner.

A pulley, *a*, is placed on the shaft of the drum C, by which motion is given to the latter. One of the drums is hung in bearings, which are longitudinally adjustable to admit of proper tension being applied to the apron.

Above one drum C is hung, in bearings resting in slotted pieces *a′ a′* of the frame A, a roller, E, said pieces being connected by a cross-piece, *b*, to which is hinged at *c* a table, F, extending to about the middle of the frame A. Springs *d d* on the under side of the table F serve to hold the same in a horizontal position, but do not prevent it from being swung down when pressure is applied from above.

The free end of the table F carries a roller, *e*. An endless apron, G, is placed around the rollers E *e*, and passes around the table F, as shown, its upper part being about flat on said table. When the table is moved on its hinges the apron will be carried up or down with it without having its rotary motion interfered with.

The roller E carries at one end a ratchet-wheel, *f*, and a loose arm, *g*, which has a spring-pawl, *h*, for the ratchet-wheel, and is connected by a pitman, *i*, with a crank-pin, *j*, on the shaft B.

By means of this connection intermittent rotary motion will be imparted to the roller E and apron G. This motion can be regulated by adjusting the pin in the end of the pitman to any of the holes in the arm *g*, so that the strokes of the arm may be lengthened or shortened at will.

The other end of the frame A carries above the other drum, C′, a roller, $E^2$, hung in bearings resting in slotted parts $a^2$ $a^2$, which are connected by a cross-piece, $b^2$, in a manner very similar to that described with reference to the roller E. To the cross-piece $b^2$ is hinged, at $c^2$, a table, $F^2$, extending to within a short distance from the end of the table F, and held up by springs $d^2$. The hinging of the table $F^2$ may, however, be dispensed with.

A roller, $e^2$, is hung in the free end of the table $F^2$ to receive an apron, $G^2$, that hangs on $E^2$ and $e^2$.

The two tables F and $F^2$ are, in their positions of rest, nearly on a common level.

The roller $E^2$ carries a ratchet-wheel, $f^2$, and loose arm $g^2$, which has a pawl, $h^2$, and is, by a pitman, $i^2$, connected with the crank-pin *j*. The motion of the aprons G $G^2$ will thus be obtained by a similar means, and should be alike in degree.

The rollers E $E^2$ are adjustable in their bearings to provide for a proper tension of their respective aprons. The shaft of the roller $E^2$ is provided with a pulley, $a^3$, and the shaft of the drum C with a pulley, *a*.

To the free end of the table F is secured by means of arms, so as to be clear of the apron G, a projecting frame-work, H, which reaches nearly to the table F, filling the space between F and $F^2$, as shown.

I I are annular cutters. They are placed in a straight or curved row or rows affixed to a plate, *k*, which is with its ends fitted between dovetailed or grooved supports *l l*, which project from the frame A. The plate *k* can be withdrawn from between the supports *l* when it is desired to sharpen the cutters. The cutters are placed vertically, so that they project through the apertures of the frame H, the said apertures being of such size and form as to nicely fit the outer sides of the cutters. The upper sharpened edges of the cutters are flush with the surface of the frame H as long as the table is held horizontally by the springs *d*; but as the cutters are stationary, they will project through the frame when the same is moved down with its table.

At the sides of the frame A, about in line with the cutter-holder *k*, are arranged vertical posts *m m*, which are slotted to constitute guides for a vertically-reciprocating cutter-block, J. This cutter-block, is by rods *n n*, connected with eccentrics *o* on the shaft B, to receive the desired up-and-down movement from the same. The upper end of the cutter-block J carries the drum L, and its lower end a pair of rollers, *p*.

An endless apron, M, passes over the drum L and rollers *p*, its lower part being above the cutters, as shown.

The drum L carries a ratchet-wheel, *q*, and loose arm *r*, which has a spring pawl, *s*, for said ratchet-wheel. The arm *r* is pivoted to a standard, *t*. The vertical movement of the cutter-block J causes the pawl to turn the apron at every other stroke. Rubber pieces *u u* are interposed between the cutter-blocks J and frame H.

Motion being given to the driving-shaft B, the various movements of the machine are effected. The paste to be cut is from the rolling apparatus (which may be generally represented by X, and which in itself forms the subject-matter of Reissued Letters Patent No. 5,100) deposited upon the apron G and fed by the same to the frame-work H.

When the paste covers the frame-work and cutters the cutter-block J moves down and forces, by means of the elastic pieces *u u*, the frame-work H over the cutters. The apron M holds the paste on the frame-work, causing the former to be pierced by the cutters, so that pieces of the desired shape will be within the cutters.

When the apron has reached the cutters the paste must have been completely cut through. The cutter-block J is then elevated, the table F following, until the frame-work H is again flush with, or rather slightly above, the cutters. The plate is then moved ahead, the waste arriving on the apron $G^2$, while a new portion is placed over the cutters by the action of the feed. The lozenges cut out fall through the cutters upon the apron D, and are by the same conveyed to a suitable receptacle.

The rotation of the apron M is provided to prevent the same from being cut by frequent contact in the same place with the knives.

The cutters are annular, as stated, for circular lozenges, but may be of other form, if desired, having, however, in every case continuous cutting-edges.

Having thus described the invention, I claim as the invention of the said WM. E. DAMANT—

1. The combination, in a lozenge-machine, of cutters, a cutter-block provided with intermittently-acting endless apron mounted thereon, and co-operating with the cutters in the cutting operation, and intermittently-acting feeding-apron, substantially as set forth.

2. Cutters and a cutter-block, the latter being provided with an intermittently-acting endless apron mounted thereon, and co-operating with the cutters in the cutting operation, combined with an intermittently-acting feed-apron and an endless delivery-apron, substantially as set forth.

3. Cutters and a cutter-block, the latter being provided with an intermittently-acting endless apron mounted thereon, and co-operating with the cutters in the cutting operation, combined with an intermittently-acting feed-apron and rotative delivering and paste-rolling appliances, substantially as set forth.

4. Cutters, a cutter-block provided with intermittently-acting endless apron mounted thereon, and co-operating with the cutters in the cutting operation, and a frame-work interposed between said cutters and cutter-block, combined with an intermittently-acting feed-apron and an endless delivery-apron, substantially as set forth.

5. A reciprocating cutter-block provided with rollers, and an endless apron mounted thereon, and ratchet mechanism for imparting an intermittent rotation to the said apron, substantially as set forth.

6. Cutters, a cutter-block provided with an endless apron mounted thereon, having intermittent rotation and co-operating with the cutters in the cutting operation, an interposed frame-work for holding the paste, an endless intermittently-acting feed-apron, and an endless delivery-apron, having means for adjusting their tension, combined with a main or common driving-shaft and ratchet and other mechanisms connected therewith, for imparting the various reciprocating movements and continuous and intermittent rotations to the respective parts, substantially as set forth.

7. A reciprocating cutter-block provided with endless apron mounted thereon, having intermittent rotation, and a feeding-table having an intermittently-acting endless apron, and provided with a projecting frame-work to support the paste during the cutting, combined with an endless delivery-apron, substantially as set forth.

8. A reciprocating cutter-block, having endless apron mounted thereon, with intermittent rotation, a feed-table having an intermittently-acting endless apron, and provided with a projecting frame-work to support the paste, and springs interposed between said reciprocating cutter-head and projecting frame-work, combined with an endless delivery-apron, substantially as set forth.

9. The combination of reciprocating cutter-block, an intermittently-acting feed-apron and a rotative delivery-apron, and mechanism, substantially as described, imparting a concurrent motion to the said parts, substantially as set forth.

10. In a lozenge-machine organized substantially as described, the combination of a reciprocating cutter-block provided with an intermittently-acting endless apron mounted thereon, and mechanism, substantially as specified, whereby the reciprocation of the said block and the intermittent rotation of the said apron are concurrently effected, as set forth.

11. A hinged feed-table carrying an endless apron and projecting frame, in combination with stationary cutters, substantially as set forth.

12. The reciprocating frame or cutter-block, combined with stationary cutters and hinged feed-table and projecting frame-work, substantially as set forth.

13. Combined with the reciprocating cutter-block and hinged feed-table, the elastic pieces *u u*, substantially as specified.

W. HESSIN.

Witnesses:
DONALD C. RIDOUT.
W. A. FOSTER.